United States Patent Office 2,791,577
Patented May 7, 1957

2,791,577

PROCESS FOR REFINING TALL OIL

Charles R. Outterson, Richmond, and John W. Eldridge, Charlottesville, Va., assignors to The Albemarle Paper Manufacturing Company, Richmond, Va., a corporation of Virginia No Drawing. Application May 5, 1952, Serial No. 286,198

12 Claims. (Cl. 260—97.7)

This invention relates to a new process for refining crude tall oil.

Generally, when crude tall oil is distilled or acid refined according to common practice, it may have a color as low as 8 (Gardner scale, 1933), but upon standing the oil darkens to a color of 9, 10 or even higher, because of the presence of latent color bodies. Although the odor of these oils is generally improved and may be further improved by heating and blowing with steam or an inert gas, they decompose upon standing and again develop a disagreeable odor. Furthermore the drying oil esters made from these tall oils are usually of poor quality due to their dark color and poor film properties.

Properly refined tall oil is, potentially, an important economic resource because of the numerous uses to which it may be applied. However, because of the difficulties hitherto attending the production of a stable tall oil of good color and free from undesirable impurities, not all of the available production has been utilized. Much of it, at present, poses a disposal problem and must be burned.

The object of this invention is to provide a new process for producing a high quality, refined tall oil which is stable, light in color and substantially odorless and which is free from latent color bodies, sulfonated impurities and the like.

Still another object is to provide a phosphoric acid treated tall oil which may be distilled to give a high yield of a light colored oil of high acid number.

Another object is to provide a light colored tall oil which does not darken with age.

Another object is to provide a highly refined tall oil which may be utilized for any purpose requiring a stable, light colored oil free from undesirable impurities and which is especially suitable for processing into drying oil esters of improved properties.

Still other objects and advantages of this invention will become obvious from the following detailed description.

Broadly speaking, our process includes a pretreatment of the crude tall oil which removes or otherwise renders innocuous colloidal, emulsifying, water soluble and other impurities, followed by treatment with phosphoric acid, removal of any remaining traces of the phosphoric acid and vacuum distillation.

The pretreatment is essential to obtain a high quality refined tall oil of the desired light color and includes a water wash and heat treatment.

Prior to treatment, the crude tall oil may or may not be dissolved in a hydrocarbon solvent. The solvent is not essential but is advantageous in reducing the viscosity of the tall oil, thus facilitating admixture with the washing and treating agents employed in the refining process and permitting somewhat more rapid sludge separation during the phosphoric acid treatment. Any suitable hydrocarbon solvent which is sufficiently volatile to be removed readily from the tall oil may be used, such as mineral spirits, petroleum naphtha and the like.

If there is any sulfuric acid present in the crude tall oil, the crude should be washed with water. Otherwise the sulfuric acid will cause a considerable amount of polymerization which will markedly reduce the yield of refined tall oil. When there is no sulfuric acid impurity in the crude, water washing is not essential, but is desirable since it possesses additional important advantages such as removing other water soluble impurities such as sulfonated compounds, colloidal matter and occluded soap. Such residual soaps, if allowed to remain in the tall oil, react with the phosphoric acid in the subsequent acid treatment and thus make it necessary to add excessive and uneconomical quantities of this rather costly reagent.

The water washing should be thorough and should, desirably, be continued for an hour or two with agitation, after which the wash water is removed. The water may be at room temperature but is preferably at a temperature of about 180° to 210° F. particularly if the tall oil is not in hydrocarbon solution. About ½ to 1 part of water per part of oil is generally adequate although more or less water may be used depending upon the particular crude oil.

The washed or unwashed oil is subjected to a heat treatment at a temperature of at least about 275° F. and, preferably, not above about 325° F. The heating should be continued for about ½ to 1½ hours. Although it may be applied for longer periods, this is not economically worthwhile since it does not produce appreciably improved results. The heat treatment apparently conditions the tall oil so that both visible and latent color bodies are more readily and completely removed during the subsequent refining steps and makes possible a lighter product than can otherwise be obtained. It also coagulates colloidal impurities and emulsifying agents present in the oil which precipitate with the sludge formed during the phosphoric acid treatment. The removal of colloidal impurities is important since it permits separation of colloidally held water and more thorough washing of the phosphoric acid treated oil to remove any remaining traces of the acid prior to distillation.

In the absence of sulphuric acid in the crude, the preliminary water washing may precede or follow the heat treatment or may be dispensed with as previously indicated. If sulphuric acid is present, the water washing should precede the heat treatment to avoid any possibility of polymerization. For reasons of economy, it is generally more practical to wash the crude first since subsequent heating evaporates any water remaining, thus preventing dilution of the phosphoric acid and reducing the amount required.

To summarize, the preheating of the crude tall oil conditions the oil so that it is more susceptible to thorough and complete treatment with phosphoric acid. In other words, it increases the ability of the phosphoric acid to produce a much lighter product. It also makes possible more thorough washing of the phosphoric acid treated oil. Preliminary water washing, while particularly essential if sulphuric acid is present, is also advantageous since it removes water soluble impurities.

We use phosphoric acid as the chemical purifying reagent since it causes little, if any, polymerization of the resin acids, with the result that the viscosity of the treated oil is relatively low and the yield after distillation is high. Since polymerized acids such as are present in tall oil refined with stronger mineral acids do not distill, the yield of distilled oil is so low as to be economically unfeasible and an important proportion of the tall oil acids is lost. Furthermore, phosphoric acid is highly efficient in combining with or catalyzing esterification of sterols and other latent and visible color bodies to form compounds which do not distill and are thus removed from the purified tall oil. It also destroys antioxidants present in the oil which improves the properties of drying oil esters made from the refined tall oil.

Since the pretreated crude tall oil is substantially free from water, about 0.5 or less to 4%, and preferably about 1 to 2%, of phosphoric acid, based on the weight of the oil, is adequate for our purpose. Although 4% does not give appreciably better results than 2%, it possesses the practical advantage of forming a more liquid sludge which is more easily drawn off. The amount of acid may be increased up to about 10% but ordinarily does not give sufficiently better results to warrant the increased cost. The phosphoric acid used should be in concentrated form, as for example, commercial 85% phosphoric acid.

The phosphoric acid treatment may be conducted at room temperature or less up to about 300° F. Higher temperatures should be avoided to prevent polymerization. Room temperature or less is entirely satisfactory when the oil is dissolved in a hydrocarbon solvent. In the absence of a solvent, higher temperatures, preferably about 212° F., are advisable in order to reduce the viscosity of the oil and thus ensure thorough admixture of the acid and obtain more rapid separation of the sludge.

With thorough agitation of the tall oil-phosphoric acid mixture, about 10 to 15 minutes are generally sufficient to give the desired results. The treatment time can be prolonged but after about ½ to 1 hour there is usually no appreciable improvement in results.

The black sludge formed during the phosphoric acid treatment separates cleanly and is removed. Both visible and latent color bodies are precipitated and removed in the sludge or remain in the tall oil in a non-distillable form.

After separation of the sludge, any phosphoric acid remaining in the tall oil should be eliminated. This may be accomplished by neutralization, as with an alkaline reagent such as caustic soda or fuller's earth. Preferably, the acid is removed by washing with water. Several washings, for example, three, may be desirable to ensure complete removal of the acid. Any sludge which remains in the tall oil is removed by the water washing. If a hydrocarbon solvent is present, the washing may be done at ordinary temperatures. When no solvent has been employed, it is advantageous to use hot water, as, for example, at about 200° to 210° F., to reduce the viscosity of the oil and thus to ensure easier, more rapid and more thorough washing. The absence of colloidally held water due to coagulation of colloidal impurities by the preliminary heat treatment also facilitates the washing. The elimination of the phosphoric acid is necessary to avoid decarboxylation of the tall oil acids during the subsequent vacuum distillation which would reduce the yield, reduce the acid number and unduly change the desired characteristics of the tall oil. The tall oil, after the phosphoric acid treatment, is still very dark in color and unsatisfactory for uses requiring a light colored, refined product.

If the tall oil has been dissolved in a hydrocarbon solvent, the solvent is removed after the water washing by distillation. The tall oil is then distilled under high vacuum.

Ordinarily, acid refined oils are so highly polymerized and viscous in character that they cannot be distilled without an overall excessive loss in yield and disproportionate losses of resin acids. However, the phosphoric acid treatment according to our process provides a substantially unpolymerized oil of relatively low viscosity which can be distilled under vacuum with little difficulty in yields as high as 85 to 95%.

The distilled product is pale yellow in color, having a color rating of about 4 to 4½ on the Gardner scale (1933), and does not darken with age. The color is equivalent to that of bleached linseed oil which grades about 5 or less. The importance of the heat treatment is clearly demonstrated by the color of the distilled product. The lightest color obtainable by distillation of crude tall oil treated according to the aforedescribed process but not subjected to a heat treatment prior to addition of the phosphoric acid, is about 6½ to 7.

The odor of the distilled tall oil is good and can be further improved by heating and blowing with steam or other inert gas. After such treatment there is no odor reversion during storage.

The fatty and resin acids are retained with little or no loss in substantially the same proportions present in the crude. The acid number is high, usually about 178 or above, showing that there has been no appreciable decarboxylation of the acids to form inert hydrocarbon or unsaponifiable matter.

The refined tall oil may be employed for any use requiring a high quality, stable product. It is particularly suitable for the manufacture of polyhydric alcohol esters, such as the pentaerythritol ester, for use as drying vehicles. The esters, which provide an excellent substitute for linseed oil, like the tall oil itself, are very light and stable in color. Films made with the esters dry more rapidly than has generally been the case hitherto. Other film properties are also improved with respect to hardness and resistance to water and alkalis.

Detailed practice of the invention is illustrated by the following examples which, however, do not limit the scope of the invention in any way.

*Example I*

Raw crude tall oil was dissolved in an equal weight of mineral spirits and divided into 3 portions.

1. The first portion was distilled under vacuum after removal of the solvent. The color of the distilled product was 8 on the Gardner scale (1933) but darkened to 9–10 upon standing. Yield 85% and acid number 178.

2. 2% by weight (based on the tall oil) of 85% phosphoric acid was added to the second portion of the crude tall oil solution and stirred for 20 minutes. The sludge was allowed to settle and then removed. The solution was washed 3 times with equal volumes of warm water (140° F.). The solvent was removed and the tall oil then distilled under vacuum. The color of the distilled oil was 6½; the acid number was 188 and the yield was 85%.

3. The third portion was washed with an equal volume of hot water, which was at a temperature of 200° F., with stirring for 2 hours. The wash water was settled and removed. The tall oil solution was then heated to 300° F. and maintained at that temperature for 1 hour with stirring. After cooling to 92° F., 2% by weight of the tall oil of 85% phosphoric acid was added to the solution and the mixture stirred for 20 minutes. The sludge was allowed to settle and removed. The tall oil solution was then washed three times with equal volumes of hot water, which was at a temperature of 200° F. After removal of the solvent, the tall oil was distilled with vacuum. The color of the distilled oil was 4½ and did not darken after prolonged storage. The acid number was 182 and the yield 95%.

*Example II*

1. A sample of raw, crude tall oil was distilled under vacuum. Immediately after distillation, the tall oil had a color of 8 which darkened to 9–10 upon standing. The acid number was 178 and the yield 85%.

2. A sample of the same raw, crude tall oil used above was washed with an equal volume of hot water, which was at a temperature of 200° F. for 2 hours with stirring. After settling, the wash water was rejected and the washed crude tall oil was heated to 300° F. with stirring for 1½ hours. The tall oil was then divided into 2 portions and the first portion distilled under vacuum. The distilled tall oil had a color of 8 immediately after distillation which turned to 9–10 upon standing. The acid number was 180 and the yield 85%.

3. The second portion of the washed and heat treated tall oil from the previous example was admixed with 4% by weight of 85% phosphoric acid and was maintained with stirring at a temperature of 212° F. for 30 minutes.

The sludge was settled and removed. After washing three times with equal volumes of hot water, which was at a temperature of 200° F., the tall oil was distilled under vacuum. The color was 4½ and showed no darkening during prolonged storage. The acid number was 184 and the yield 95%.

In all of the preceding examples, the distillations were carried to 600° F. at a pressure of 10–15 mm.

*Example III*

Samples of distilled tall oil prepared by the methods of Example I (1) and Example I (3) were esterified with pentaerythritol under identical conditions. The esters were bodied equally, diluted to 50% solids with mineral spirits and admixed with driers. Similar films were then prepared with both ester compositions and the following tests made. The ester made from the tall oil of Example I (3), namely the tall oil which, prior to distillation had been given a water wash, heat, phosphoric acid and water wash treatment, produced a film which was much superior in its properties to those of the film made with the ester from Example I (1) in which the tall oil had had no pretreatment other than solution in a hydrocarbon solvent.

| Test | Ester from Example I, 3 | Ester from Example I, 1 |
| --- | --- | --- |
| Drying time: | | |
| Set to touch | 1 hr | 2 hrs. |
| Tack free | 10 hrs | 18 hrs. |
| Sward hardness: | | |
| 24 hrs | 48 | 46. |
| 120 hrs | 108 | 90. |
| Viscosity (Gardner): | | |
| Without drier | D–E | <A. |
| With drier | G–H | <A. |
| Color (Gardner 1933): | | |
| Without drier | 5 | 9. |
| With drier | 7 | 12. |
| Water Resistance: | | |
| After 24 hr. immersion | Whitening | More definite whitening. |
| 20 min. dry | Whitening gone on upper half. | ½ inch white spot remaining. |
| 2 hrs. dry | Clear | Do. |
| 24 hrs. dry | ----do---- | Clear. |
| Alkali Resistance: | | |
| 30 min | Film whitish and wrinkled. | Film white. |
| 1 hr | ----do---- | Film dissolving and dropping off. |
| 1½ hrs | ----do---- | Film completely dissolved. |
| 2 hrs | Film beginning to dissolve. | |

Although this invention has been described with reference to illustrative embodiments thereof, it will be apparent to those skilled in the art that the principles of this invention may be embodied in other forms, but within the scope of the appended claims.

We claim:

1. A process for refining tall oil which comprises preheating the crude tall oil at a maximum temperature of about 325° F., then admixing said tall oil with concentrated phosphoric acid, separating the resulting sludge from the tall oil, removing any remaining phosphoric acid from the tall oil and then distilling the tall oil under vacuum.

2. A process for refining tall oil which comprises preheating the crude tall oil at a maximum temperature of about 325° F., then admixing said tall oil with concentrated phosphoric acid in an amount not exceeding about 10% by weight of the tall oil, separating the resulting sludge from the tall oil, removing any remaining phosphoric acid from the tall oil and then distilling the tall oil under vacuum.

3. A process for refining tall oil which comprises preheating the crude tall oil at a maximum temperature of about 325° F., then reacting said tall oil with concentrated phosphoric acid in an amount up to about 4% by weight of the tall oil, at a maximum temperature of about 300° F., separating the resulting sludge from the tall oil, washing the tall oil with water to remove any remaining phosphoric acid and then distilling the tall oil under vacuum.

4. A process for refining tall oil which comprises preheating the crude tall oil at a maximum temperature of about 325° F., then reacting said tall oil with about 1 to 2% of concentrated phosphoric acid, based on the weight of the tall oil, at a maximum temperature of about 300° F., separating the resulting sludge from the tall oil, washing the tall oil with water to remove any remaining phosphoric acid and then distilling the tall oil under vacuum.

5. A process for refining tall oil which comprises dissolving the crude tall oil in a hydrocarbon solvent, preheating the tall oil solution at a maximum temperature of about 325° F., then admixing said tall oil solution with concentrated phosphoric acid in an amount up to about 4% of the weight of the tall oil, separating the resulting sludge from the tall oil solution, washing the tall oil solution with water to remove any remaining phosphoric acid, removing the hydrocarbon solvent and then distilling the tall oil under vacuum.

6. A process for refining tall oil which comprises water washing the crude tall oil, preheating the tall oil at a maximum temperature of about 325° F., then admixing said tall oil with concentrated phosphoric acid in an amount not exceeding about 10% by weight of the tall oil, separating the resulting sludge from the tall oil, removing any remaining phosphoric acid from the tall oil and distilling the tall oil under vacuum.

7. A process for refining tall oil which comprises water washing the crude tall oil, preheating the tall oil at a temperature of about 275° to 325° F., then reacting said tall oil with phosphoric acid in an amount up to about 4% by weight of the tall oil at a maximum temperature of about 300° F., separating the resulting sludge from the tall oil, washing the tall oil with water to remove any remaining phosphoric acid and then distilling the tall oil under vacuum.

8. A process for refining tall oil which comprises dissolving the crude tall oil in a hydrocarbon solvent, water washing the tall oil solution, preheating the tall oil solution at a temperature of about 275° to 325° F., then reacting the tall oil solution with concentrated phosphoric acid in an amount up to about 4% by weight of the tall oil at a maximum temperature of about 300° F., separating the resulting sludge from the tall oil solution, washing the tall oil solution with water to remove any remaining phosphoric acid, removing the hydrocarbon solvent and then distilling the tall oil under vacuum.

9. A process for refining tall oil which comprises preheating the tall oil at a maximum temperature of about 325° F., water washing the tall oil, then admixing the tall oil with concentrated phosphoric acid in an amount up to about 4% by weight of the tall oil, separating the resulting sludge from the tall oil, removing any remaining phosphoric acid from the tall oil and then distilling the tall oil under vacuum.

10. A process for refining tall oil which comprises water washing the crude tall oil, preheating the tall oil at a temperature of about 275–325° F., then admixing the tall oil with about 1 to 2% of concentrated phosphoric acid, based on the weight of the tall oil, at a maximum temperature of about 300° F., separating the resulting sludge from the tall oil, washing the tall oil with water to remove any remaining phosphoric acid and then distilling the tall oil under vacuum.

11. A process for refining tall oil which comprises dissolving the crude tall oil in a hydrocarbon solvent, water washing the tall oil solution, preheating the tall oil solution at a temperature of about 275–325° F., then admixing the tall oil solution with about 1 to 2% of concentrated phosphoric acid based on the weight of the tall oil, separating the resulting sludge from the tall oil solution, washing the tall oil solution with water to remove any remaining phosphoric acid, removing the hydrocarbon solvent and then distilling the tall oil under vacuum.

12. A process for refining tall oil which comprises dissolving the crude tall oil in a hydrocarbon solvent, water washing the tall oil solution, preheating the tall oil solution at a maximum temperature of about 325° F., then admixing the tall oil solution with concentrated phosphoric acid in an amount not exceeding about 10% by weight of the tall oil, separating the resulting sludge from the tall oil solution, washing the tall oil solution with water to remove any remaining phosphoric acid, removing the hydrocarbon solvent and then distilling the tall oil under vacuum.

References Cited in the file of this patent

UNITED STATES PATENTS

| | | |
|---|---|---|
| 1,807,483 | Logan | May 26, 1931 |
| 1,964,875 | Freiburg | July 3, 1934 |
| 2,409,216 | Lee | Oct. 15, 1946 |
| 2,413,009 | Taussky | Dec. 24, 1946 |
| 2,525,892 | Gates et al. | Oct. 17, 1950 |